(12) United States Patent
Seals

(10) Patent No.: US 6,772,639 B2
(45) Date of Patent: Aug. 10, 2004

(54) APPARATUS FOR DETECTING AND WARNING OF UNDER/OVER-INFLATION OF INFLATABLE CUSHIONS

(76) Inventor: Christine Lezlie Seals, 777 NE. 8<sup>th</sup> St., Apt. 304, Gresham, OR (US) 97030

( * ) Notice: Subject to any disclaimer, the term of this patent is extended or adjusted under 35 U.S.C. 154(b) by 138 days.

(21) Appl. No.: 10/152,135

(22) Filed: May 21, 2002

(65) Prior Publication Data

US 2003/0217601 A1 Nov. 27, 2003

(51) Int. Cl.<sup>7</sup> .............................. G01L 7/00; B60R 21/30
(52) U.S. Cl. .......................................... 73/714; 280/738
(58) Field of Search ............................ 73/37, 700, 735, 73/736, 714, 756, 729.1; 340/626, 627; 186/271, 273; 280/734, 735, 738

(56) References Cited

U.S. PATENT DOCUMENTS

| 4,643,481 A | | 2/1987 | Saloff | 297/452.25 |
|---|---|---|---|---|
| 5,152,579 A | * | 10/1992 | Bishai | 297/284.6 |
| 5,473,313 A | * | 12/1995 | Graebe, Jr. | 340/626 |
| 5,487,197 A | * | 1/1996 | Iskra et al. | 5/654 |
| 5,819,779 A | | 10/1998 | Takemura | 137/229 |
| 5,903,941 A | | 5/1999 | Shafer | 5/713 |
| 5,963,997 A | | 10/1999 | Hagopian | 5/654 |
| 5,979,585 A | * | 11/1999 | Van Voorhies | 180/273 |
| 6,216,299 B1 | | 4/2001 | Kohlman | 5/654 |
| 6,374,666 B1 | | 4/2002 | Lemberger | 73/146.8 |

\* cited by examiner

*Primary Examiner*—William Oen
(74) *Attorney, Agent, or Firm*—Edwin A. Skoch

(57) ABSTRACT

An apparatus intended to reduce or eliminate human tissue damage caused by under- or over-inflation of air-filled bodily support cushions by sensing the internal air pressure and alerting the user to that pressure. The apparatus uses a simple, inexpensive, analog or digital gauge connected to the exterior of cushions, such as those cushions used on the seats of wheelchairs. It can also use an audible warning activated by the gauge, indicating cushion pressure outside a pre-set range of values. The apparatus also includes a valve that can be used to release or add pressure to the cushion. Further, the length of the apparatus can be varied so that the outlet valve can be easily accessed and/or the gauge can be easily viewed.

6 Claims, 5 Drawing Sheets

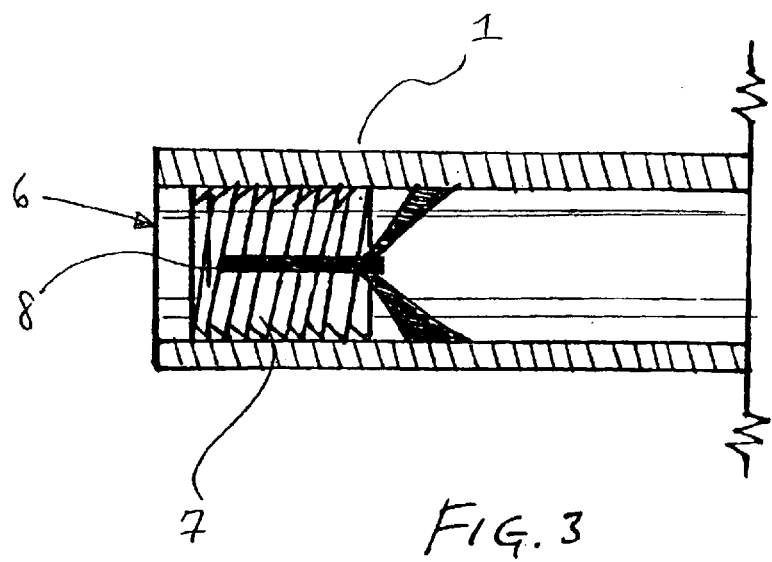
FIG. 3
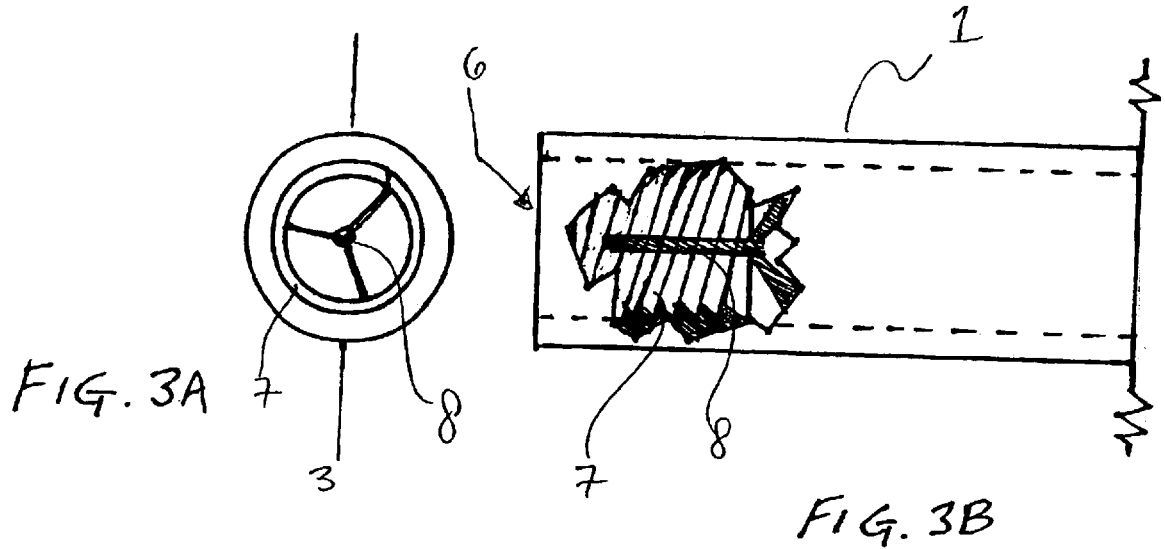
FIG. 3A
FIG. 3B
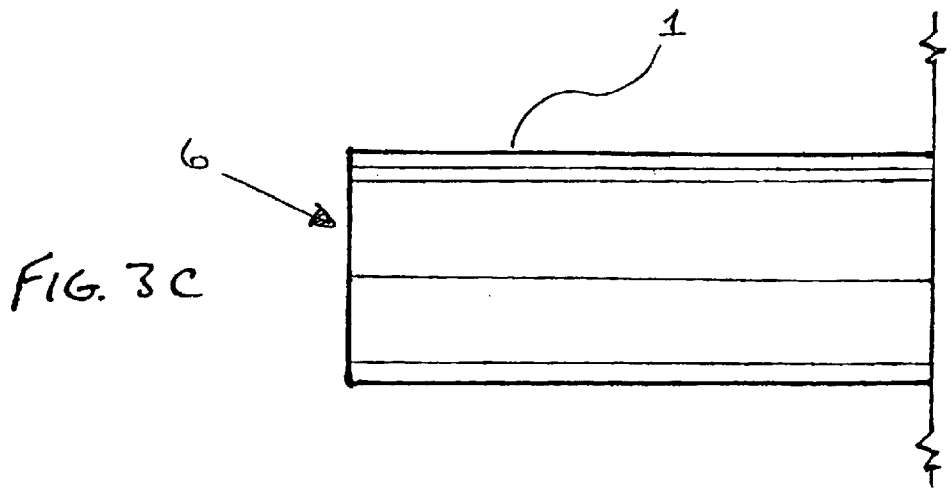
FIG. 3C

APPARATUS FOR DETECTING AND WARNING OF UNDER/OVER-INFLATION OF INFLATABLE CUSHIONS

FIELD OF INVENTION

This invention relates primarily to accessories for inflatable seat and body support systems-more particularly, the function of and accessories to inflatable cushioning systems associated with wheelchairs, cushions for beds, other body-supporting medical devices, and orthopedic devices.

BACKGROUND OF THE INVENTION

The following represents a list of known related art:

| Reference: | Issued to: | Date of Issue: |
|---|---|---|
| U.S. Pat. No. 5,963,997 | Hagopian | Oct. 12, 1999 |
| U.S. Pat. No. 4,643,481 | Saloff | Feb. 17, 1987 |

An ongoing problem associated with extended use of wheelchairs or similar supporting medical devices is the development of sores and tissue damage, caused by constant, long term pressure on body tissue. Simply put, damage occurs in body tissue that has been subjected to external pressure that restricts blood flow to tissues. These sores are also known as bedsores, pressure ulcers, pressure sores, and decubitus ulcers; this damage can even cause infection, requiring hospitalization and/or medical treatment.

To lessen pressure on body tissues and prevent this tissue damage, people who are confined to or are regular users of wheelchairs or similar supportive devices or beds commonly use supportive cushions. For wheelchair users, these cushions are used on the backs and/or seats of their wheelchairs. A common type of cushion contains an adjustable, inflatable bladder or bladders to support the user.

However, these cushions themselves can cause the same tissue damage, due primarily to under- or over-inflation of the cushion bladder(s). Moreover, users with impaired sensation may not be aware of the under/over-inflation of the cushion that can lead to tissue damage. This is particularly true with people who try to be as self-reliant as possible and do not have full-time medical assistance or caregivers.

Many have attempted to overcome this problem using various cushion designs, attempting to relieve pressure, but have been largely unsuccessful, or, at best, partially successful. Others have used complex means of regulating pressure, including expensive, bulky, and complicated powered inflation devices that must be continually attached and electrically powered.

The short length of existing valve stems on commercially available inflatable cushioning systems associated with wheelchairs, cushions for beds, other body-supporting medical devices, and orthopedic devices makes it difficult to add air to the cushion bladders. In most cases, the user must get off the cushion in order for the existing valve stem to be accessed to either add or release air from the cushion bladder. This can be a time consuming and difficult proposition, particularly for those with limited sensation, mobility and/or strength.

The claimed invention attempts to solve these problems using a simple means of alerting the user to under and/or over-inflation of these cushions by measuring the internal air pressure of the cushion and indicating under or over-inflation to the user or their caregivers or assistants. Further, the claimed invention can utilize longer air hoses, so that the outlet valve on the invention can be easily accessed and utilized by the user or an assistant.

SUMMARY AND ADVANTAGES OF THE INVENTION

This apparatus for detecting and warning of under/over-inflation of inflatable cushions is a simple digital or analog gauge that is attached to an existing inflatable cushion—to the existing valve stem—on all commonly commercially available inflatable cushioning systems associated with wheelchairs, cushions for beds, other body-supporting medical devices, and orthopedic devices. The gauge indicates the air pressure inside the cushion, and warns the user of under or over-inflation. The apparatus actuates the cushion's existing valve, allowing air to flow freely out of the cushion and allowing the cushion's air pressure to be measured. The apparatus also includes an outlet valve, which can be attached to a pump or be manually operated to increase or decrease air pressure inside the cushion.

The apparatus' gauge may be located in a variety of places by using variable lengths of air hose connecting the apparatus' gauge to the cushion's valve stem, or the air hose connecting the gauge to the outlet valve of the apparatus. Gauge placement can range from placement immediately adjacent to the cushion, using a short air hose, to gauge placement near the user's mouth, simply by increasing the length of the connecting air hose. The gauge may also be placed near the user's hand or the armrest of the wheelchair, to provide easy access and visibility.

Warning to the user can result from three methods: a visible analog gauge with a dial showing cushion pressure, a digital gauge with a pressure reading, or a gauge which produces an audible sound, alerting the user to pressure variations outside of a pre-set range.

When the apparatus uses an audible warning gauge, the user can set upper and/or lower values for the desired pressure in the cushion. Once the pre-set value is exceeded, in the case of over-inflation, an audible warning sounds. If the pressure falls below a pre-set value, as in the case of under-inflation, an audible warning sounds. The user then manually adjusts the pressure by letting air out or adding air manually or by pump.

The apparatus has a means of adding or releasing pressure from the cushion. An outlet valve—opposite the end connecting the apparatus to the existing cushion—can be used to attach inflation devices, such as pumps, or it can allow air in or out of the cushion when activated manually by the user.

This apparatus for detecting and warning of under/over-inflation of inflatable cushions overcomes an inherent problem of inflatable cushions in that it detects the state of under- or over-inflation of inflatable, supportive cushioning systems associated with wheelchairs, cushions for beds, other body-supporting medical devices, and orthopedic devices.

Additionally, it overcomes a second inherent problem in the existing art in that it warns the cushion's user of states of under- or over-inflation.

Additionally, this apparatus overcomes the complexity, expense, bulkiness, and electrical power requirements of other inflation systems by using a simple visible or audible pressure gauge and valve system.

Additionally, this apparatus allows for use of cushions without sacrificing utility of the cushions and their associated accessories. The apparatus' outlet valve can be used to add or release pressure to/from the cushion's interior bladder, just as was possible with the original cushion. The apparatus allows for the use of the inflation pumps which are supplied with the original cushions, or other types of pumps, depending on the configuration of the outlet valve and outlet valve stem.

Additionally, the placement of invented apparatus' outlet valve is useful for adding or releasing pressure to/from the cushion while the cushion is in use and increases the utility of the cushion. That is, since the outlet valve can be placed where it is accessible to the user—whether near the user's hands, mouth, or near the arm rest of a wheelchair, for example—the apparatus increases the utility of the existing cushion. Rather than forcing the user to get off of the cushion in order to add or release pressure to/from the cushion's interior bladder, the user can perform these tasks while the cushion is in use.

BRIEF DESCRIPTION OF THE DRAWINGS

FIG. 3 shows a right side elevation, sectional view of one end of the invented apparatus, where it attaches to the existing cushion. FIG. 3A shows a front elevation view thereof, showing the plane of the sectional view, but not showing the gauge. FIG. 3B shows a right side elevation view thereof, with a cut-out. FIG. 3C shows a right side elevation view thereof.

DESCRIPTION OF THE INVENTION

Figure 1:
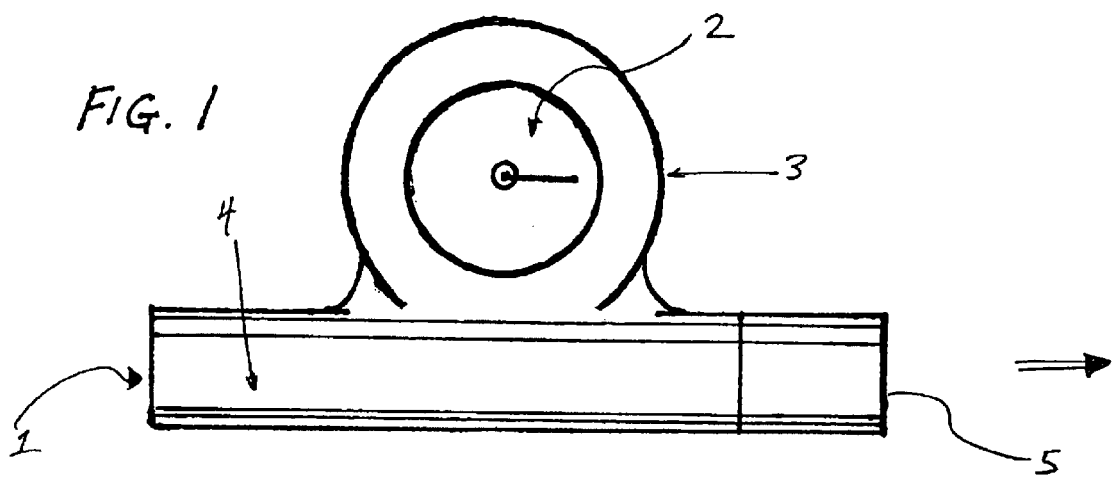
FIG. 1 shows a right side elevation view of the first embodiment of the invented apparatus. An arrow indicated outward airflow from the cushion, for illustrative purposes.
Figure 1A:
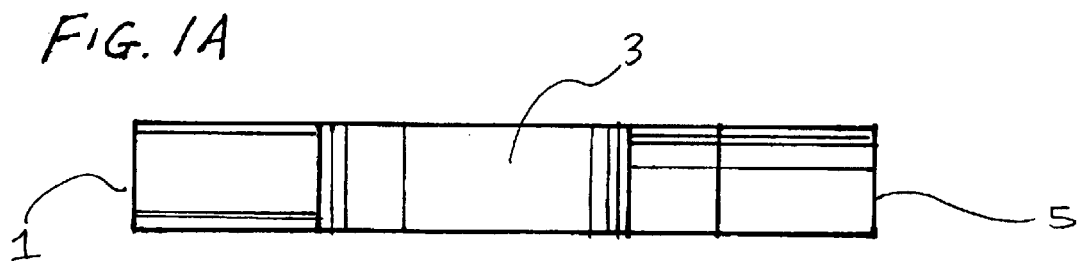
FIG. 1A shows a top plan view thereof.
Figure 1B:
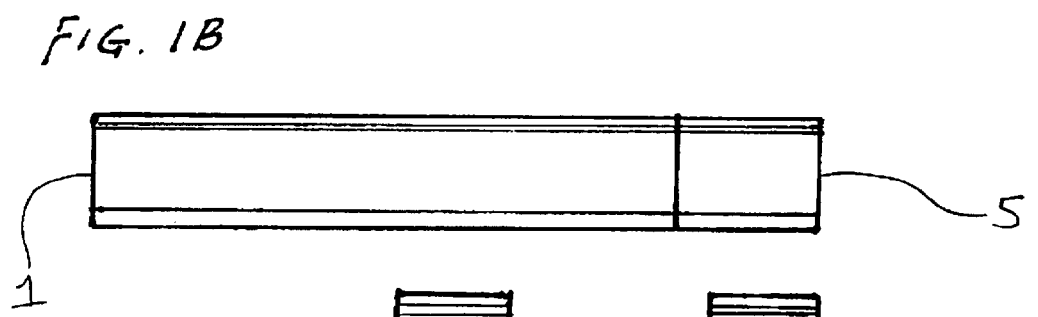
FIG. 1B shows a bottom plan view thereof.
Figures 1C, 1D:
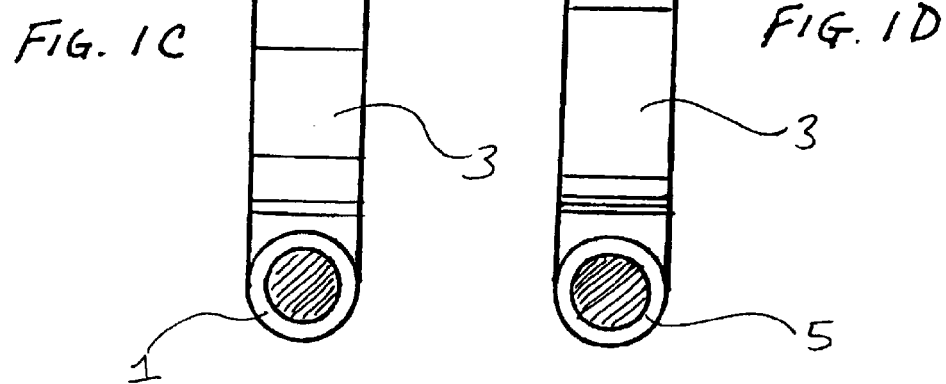
FIG. 1C shows a rear elevation view thereof.
FIG. 1D shows a front elevation view thereof.

Referring particularly to the drawings, FIGS. 1, 1A, 1B, 1C, and 1D shows the first embodiment of the invented apparatus (disconnected from the cushion's valve stem). An arrow indicated outward airflow from the location.

The invented apparatus has four basic, functional parts in its first preferred embodiment. It has an end which physically connects to the cushion's existing valve stem and actuates that existing valve stem. This functional part is called the cushion connection end 1.

The second functional part is the pressure-measuring gauge 2 and its associated gauge housing 3. A third functional part is the air hose 4 connecting the cushion connection end 1 to the pressure-measuring gauge 2. The fourth basic, function part is opposite the cushion connection end 1 and it is called the pump connection end 5.

The pump connection end 5 provides a point of attachment for pumps or other means of adding air to the cushion or releasing air from the cushion. It is shown in FIG. 1 to be opposite the cushion connection end, at an approximately 180 degree angle from the cushion connection end 1, but can be at a right angle to the cushion connection end 1 as well. It is fluidly connected to the pressure-measuring gauge 2, the air hose 4, and the cushion connection end 1.

The pump connection end 5 is meant to be identical in configuration and function to the existing valve stem of the cushion, so that any pump or inflation means normally used with the cushion as purchased—or inflation means or accessory sold by the cushion manufacturer—can be attached to and used with the invented apparatus.

Figure 2:
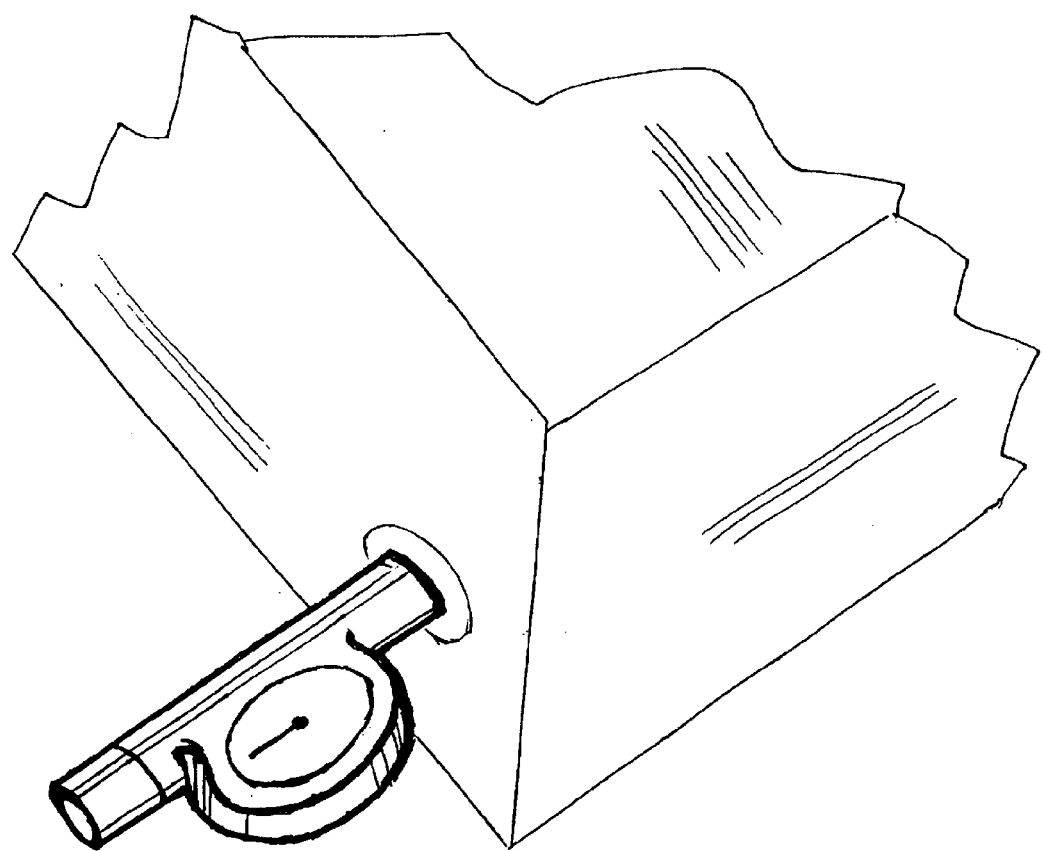
FIG. 2 is a perspective view of the invention attached to a common, commercially available wheelchair cushion for illustrative purposes.

FIG. 2 shows a completed, final installed configuration of the first embodiment of the invented apparatus. Note that the gauge face is turned upright, so that the user of the cushion or an assistant can read the gauge's measurement.

The cushion, used for solely for illustrative purposes, in FIG. 2, is similar in makeup to most commercially available wheelchair cushions, in that these cushions are manually inflated from an existing valve stem, which typically emerges from the side or corner of most commercially available cushions.

The invented apparatus can be attached to the cushion's existing valve by several means. Suitable means for fluidly connecting the invented apparatus are well known in the technical field. First, the invented apparatus may be screwed onto the existing valve stem. This type of standard valve is most typically called a Schrader valve. Some commercially available cushions use this standardized valve stem, similar in construction to most bicycle and automobile tires. An illustrated example of a threaded-end, standard valve stem configuration is shown in U.S. Pat. No. 6,374,666 (particularly that '666's FIG. 1, valve stem 12), which is incorporated herein by reference.

If the cushion's existing valve is a Schrader type valve, screwing the invented apparatus onto the end of the existing valve stem will provide an air-tight seal with the existing valve, actuate the cushion's existing valve by compressing the Schrader valve's plunger inward, and allow fluid from the inside of the cushion to flow freely through the air hose 4 and to the pressure-measuring gauge 2, and activate the pressure-measuring gauge 2 in the invented apparatus. With this type of configuration, the interior diameter dimension of the cushion connection end 1 is larger than the exterior diameter dimension of the existing valve stem, allowing for the cushion connection end 1 to be screwed onto and over the end of the existing valve stem.

By way of illustration, and referring to FIGS. 3, 3A, 3B, and 3C, a sectional view is shown (FIG. 3) of cushion connection end 1, used when the cushion's existing valve stem is of the Schrader type. The cushion connection end's opening 6 is to be screwed onto the existing cushion valve stem's threaded end, by means of internal threads 7. The interior diameter dimension of these internal threads will match the exterior diameter dimension of the existing valve stem so that the cushion connection end 1 to be screwed onto and over the end of the existing valve stem. Once the cushion connection end 1 is screwed onto and over the end of the existing valve stem, the plunger inside the existing cushion valve stem is then engaged and actuated by a plunger pin 8, which opens the cushion's valve, allowing air to flow freely from the cushion's existing valve stem, through to the invented apparatus' pressure-measuring gauge 2. Once again, this method is well known in the technical field and prior art, and illustrated by U.S. Pat. No. 6,374,666 (particularly '666's FIG. 4, 72).

An alternative means for fluidly connecting the invented apparatus is also well known in the technical field, although the valve type is somewhat less commonly used: the Presta type valve. It is well known in the prior art that the Presta type valve is opened and closed by screwing the Presta valve open or closed. There are two alternative ways for the invented apparatus to connect to a Presta type valve.

First, there are commercially available adapters that longitudinally attach to Presta type valves, causing them to functionally operate as Schrader type valves. These adapters fit over open Presta valve stems, and provide a Schrader type secondary valve, plunger, and threaded end that can then be operated normally, in place of the Presta valve, as noted above.

Figure 4:
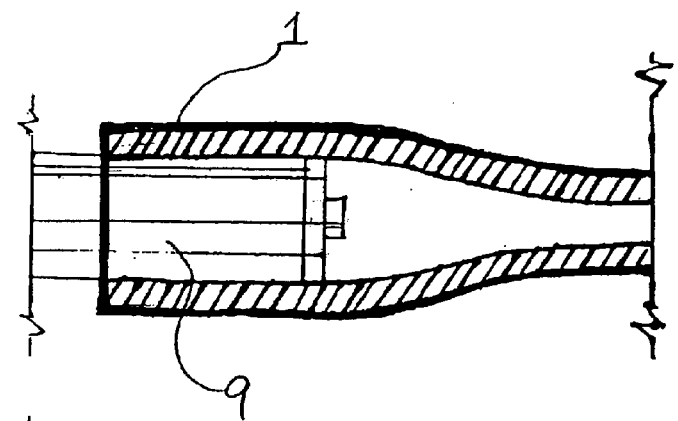
FIG. 4 shows a right side elevation, sectional one end of the invented apparatus. A Presta-type valve is shown inserted into the end thereof, for illustrative purposes.
Figure 4A:
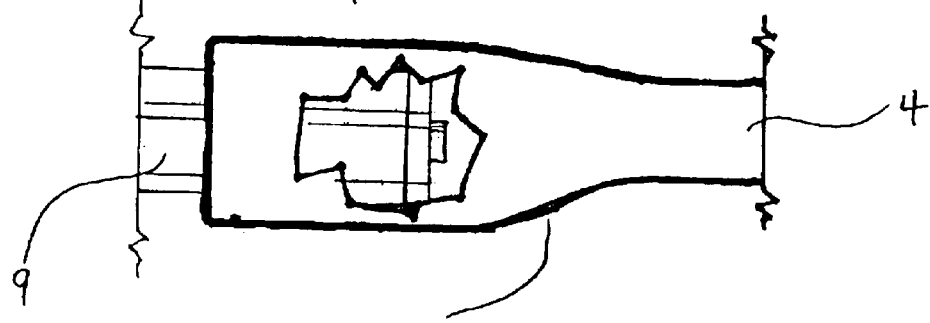
FIG. 4A shows a right side elevation view thereof, with a cut-out.
Figure 4B:
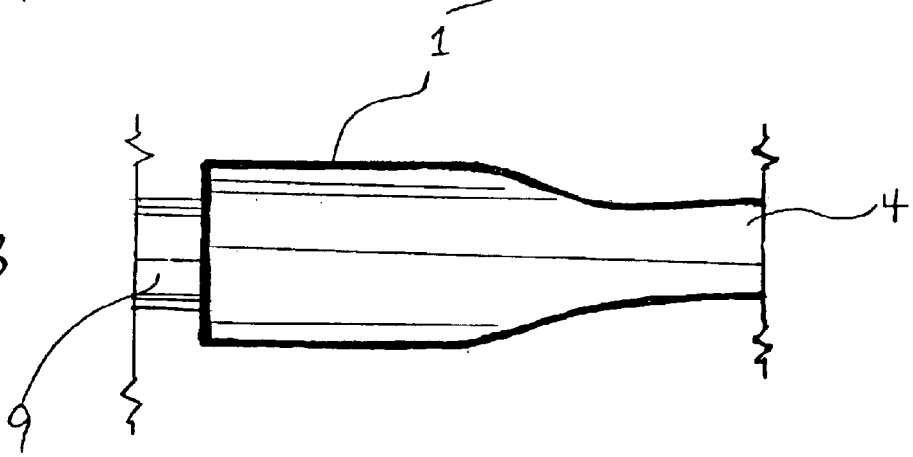
FIG. 4B shows a right side elevation view thereof.

Second, referring to FIGS. 4, 4A, and 4B, an even more simple connection to an existing Presta type valve can be made. The existing Presta valve may be opened, and a snug, flexible hose can be slid over the existing valve stem, creating an air tight seal around the existing valve stem and completely covering the end of the existing valve stem. This is illustrated in FIG. 4, which shows a sectional view of the cushion connection end 1, slid over an opened, existing Presta valve stem 9.

Regardless of whether the Presta type valve or Schrader type valve is used in the cushion's existing valve stem, the invented apparatus is a single embodiment because both valve types and methods of actuating the valves are well known in the technical field and constitute prior art.

The pump connection end 5, as shown in FIGS. 1, 1A, 1B, 1C and 1D, uses a Schrader type or Presta type valve, for connection to an external pump, so that air can be added to the cushion while the invented apparatus is attached. The valve type choice for the pump connection end 5 will, in most cases, match the valve type used in the cushion's existing valve stem.

The gauge face is shown in the center of the body of the invented apparatus, in FIG. 1. This is not a necessary part of any embodiment, nor is the shape of the gauge or body of the invented apparatus. However, regardless of the shape or look of the gauge or body, the gauge is intended to be visible and readable from a distance of several feet, so that the user of the cushion or a caregiver or assistant can read the gauge's measurement without needing to be overly close to the gauge.

The first embodiment of the invented apparatus uses an analog gauge of type well known in the technical field, most commonly referred to as a Bourdon tube pressure gauge.

Figure 5:
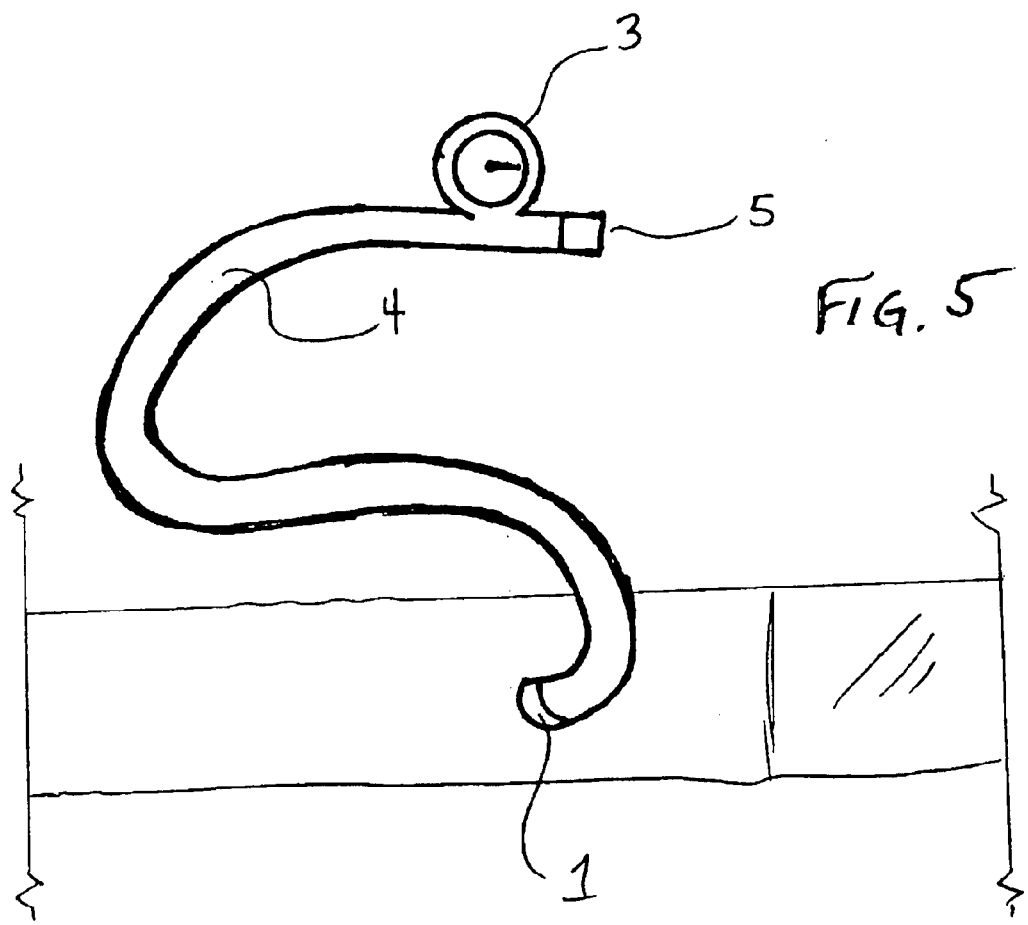
FIG. 5 shows a right side elevation view of a second embodiment of the invented apparatus. The invented apparatus is shown connected to a cushion, for illustrative purposes.

Referring to FIG. 5, a second embodiment of the invented apparatus is shown, wherein the length and flexibility of air hose 4 from the cushion connection end 1 to the actual gauge housing 3, is sufficient such that pressure-measuring gauge 2 itself may be mounted or placed in a position such that the gauge is more easily read or the pump connection end 5 is more easily accessed. A possible use for this third embodiment is to connect the gauge to the armrest of a wheelchair.

A third embodiment effects only the pump connection end 5 of the invented apparatus. It is an alteration of the pump connection end 5 which will allow the user to actuate the valve in the pump connection end 5 so that air pressure can be released from the cushion's interior bladder, should the user so desire or should the air pressure reading on the invented apparatus' pressure-measuring gauge 2 be, in the users opinion, too high. Of course, this embodiment is only used if the pump connection end 5 uses a Schrader type valve, rather than a Presta valve. There are two primary ways of accomplishing this actuation of the valve on the pump connection end 5. Since they are functionally the same, and either will constitute the same embodiment.

First, the pump connection end 5 can provide a means of mechanically depressing the valve plunger present in a Schrader valve so that air flows freely from the Schrader valve. This can be done with any sort of lever that pushes the Schrader valve plunger inward.

Second, another way of actuating the outlet valve on the pump connection end 5 uses a thumb-twisted lever that activates a twist valve. Twist valves are well known in the prior art and well known in the technical field. By turning the thumb lever, the valve is opened or closed.

A fourth embodiment of the invented apparatus is not shown in the figures. An audible buzzer or other sound-making device can be added inside the gauge housing 3 of the invented apparatus and electronically connected to the gauge mechanism so that the buzzer or sound-making device activates whenever the gauge reading is outside of a certain preset range of values. Audible buzzers or sound-emitting devices are commonly used as indicators of pressure variance and are readily available commercially, particularly in the sporting goods industry, and particularly with respect to diving watches and equipment. With this embodiment, the user or his or her assistant can set the range of acceptable pressure values for the internal cushion pressure, so that the sound-making device activates when the pressure is outside its acceptable range.

I claim:

1. An apparatus for detecting and warning of under- or over-inflation of inflatable seat cushions, comprising: a fluid pressure measuring gauge removably attachable to the exterior of said cushion, and in fluid communication with the interior bladder of said cushion, wherein said gauge further comprises an analog readout, which visibly indicates an approximate present-time fluid pressure inside said cushion and wherein said gauge is mounted in such a position that the readout of said gauge is visible to the user of said cushion.

2. An apparatus, as in claim 1, wherein said gauge operates mechanically without electronics and without a power source.

3. An apparatus, as in claim 1, further comprising a manually-operated, mechanical valve for releasing fluid from said bladder in said cushion and for adding fluid to said bladder in said cushion.

4. An apparatus, as in claim 3, wherein said valve is mounted in such a position that fluid can be added to or removed from said cushion by the user orally without the user of said cushion getting off of said cushion.

5. An method for detecting and warning of under- or over-inflation of inflatable seat cushions, which comprises:

a) continually measuring fluid pressure present inside the bladder of an inflatable cushion;

b) continually and visibly communicating said measured fluid pressure to the user of said cushion, so that the user of said cushion is aware of the present level of cushion inflation.

6. A seat cushion air pressure detecting and warning apparatus which comprises:

a) fluidly, but removeably, attaching an air hose to an inflatable cushion;

b) fluidly connecting an analog, unpowered fluid pressure measuring gauge with a visible read-out to said air hose; and c) fluidly connecting a manually-operated, mechanical outlet valve to both said gauge and said air hose, so that said outlet valve can be used to release or add fluid pressure from or to said cushion.

* * * * *